(12) United States Patent
Selg et al.

(10) Patent No.: US 10,859,277 B2
(45) Date of Patent: Dec. 8, 2020

(54) AIR-CONDITIONER

(71) Applicant: Electrolux Appliances Aktiebolag, Stockholm (SE)

(72) Inventors: Jaan Selg, Stockholm (SE); Jessica Dahlkvist, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 824 days.

(21) Appl. No.: 14/888,203

(22) PCT Filed: Jun. 18, 2014

(86) PCT No.: PCT/EP2014/062878
§ 371 (c)(1),
(2) Date: Oct. 30, 2015

(87) PCT Pub. No.: WO2014/206846
PCT Pub. Date: Dec. 31, 2014

(65) Prior Publication Data
US 2016/0097547 A1   Apr. 7, 2016

(30) Foreign Application Priority Data

Jun. 24, 2013   (SE) ...................................... 1300445

(51) Int. Cl.
*F24F 1/022* (2019.01)
*F24F 13/20* (2006.01)
(Continued)

(52) U.S. Cl.
CPC .......... *F24F 1/022* (2013.01); *B01D 46/4227* (2013.01); *F16L 11/00* (2013.01);
(Continued)

(58) Field of Classification Search
CPC .. F24F 1/025; F24F 1/04; F24F 1/0003; F24F 1/0007; F24F 1/0018; F24F 1/0022;
(Continued)

(56) References Cited

U.S. PATENT DOCUMENTS 2,050,470 A   8/1936   Smith
2,115,288 A   4/1938   Smith
(Continued)

FOREIGN PATENT DOCUMENTS

| EP | 0979976 | 2/2000 |
|---|---|---|
| GB | 2194631 A | 3/1988 |
| JP | 3021038 | 2/1992 |

OTHER PUBLICATIONS

International Search Report for PCT/EP2014/062878, dated Oct. 31, 2014, 4 pages.
(Continued)

*Primary Examiner* — Joseph F Trpisovsky
(74) *Attorney, Agent, or Firm* — Pearne & Gordon LLP

(57) ABSTRACT

A high elongated portable air-conditioner includes a compressor, a condenser, and an evaporator located inside a housing. The air conditioner also includes a cool air inlet and outlet and a warm air inlet and outlet. The air-conditioner has an axial evaporator fan and a radial condenser fan and the housing of the air-conditioner has an elongated shape where the end sections of the elongated air conditioner housing forms a top section and a bottom section, respectively. Other features of a portable air-conditioner are also disclosed.

1 Claim, 17 Drawing Sheets

(51) Int. Cl.
  *F24F 13/28* (2006.01)
  *F24F 1/04* (2011.01)
  *F24F 13/30* (2006.01)
  *B01D 46/42* (2006.01)
  *F16L 11/00* (2006.01)
  *F24F 13/08* (2006.01)

(52) U.S. Cl.
  CPC ............... *F24F 1/04* (2013.01); *F24F 13/20* (2013.01); *F24F 13/28* (2013.01); *F24F 13/30* (2013.01); *F24F 2013/087* (2013.01); *F24F 2013/202* (2013.01); *F24F 2013/205* (2013.01); *F24F 2221/12* (2013.01)

(58) Field of Classification Search
  CPC ...... F24F 1/0025; F24F 1/0029; F24F 1/0033; F24F 13/20; F24F 13/28; F24F 13/30; F24F 2013/202; F24F 2013/205; F24F 2013/207; B01D 46/4227

USPC ............................................................ 62/93
  See application file for complete search history.

(56) References Cited

U.S. PATENT DOCUMENTS

| | | | |
|---|---|---|---|
| 2,234,753 A | 3/1941 | Frazer | |
| 3,208,236 A | 9/1965 | Alvaro | |
| 2002/0157415 A1* | 10/2002 | Liu | F24F 1/027 62/298 |
| 2006/0054712 A1* | 3/2006 | Wu | F24F 3/153 236/44 A |

OTHER PUBLICATIONS

AU Office action for application No. 2018279058, dated Jul. 18, 2019, 5 pages.

\* cited by examiner

Vertical Fin Placement

Horizontal Fin Placement

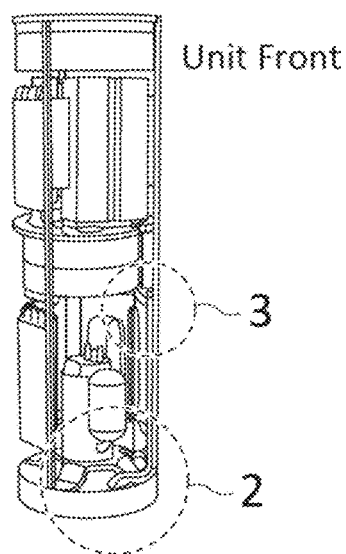
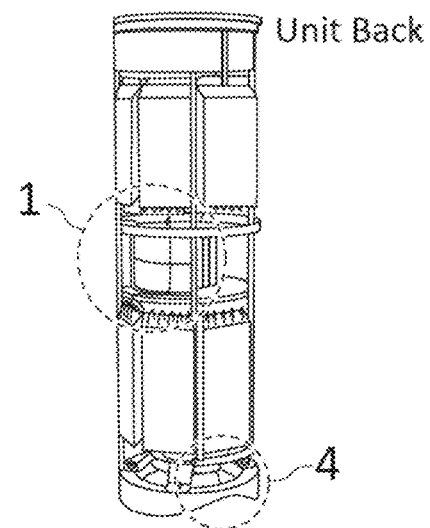
Fig. 9a  Fig. 9b
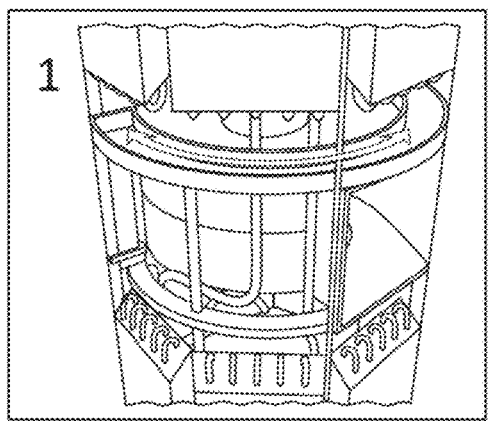
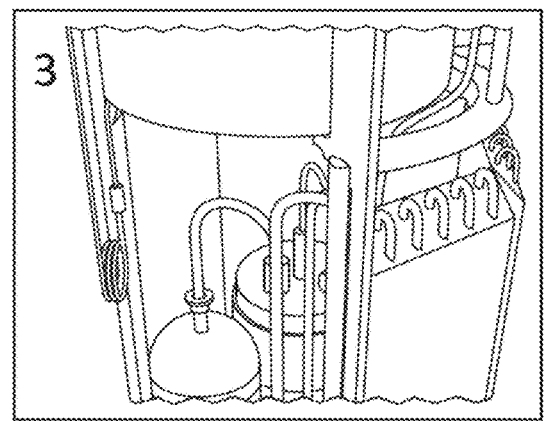
Fig. 9c  Fig. 9d
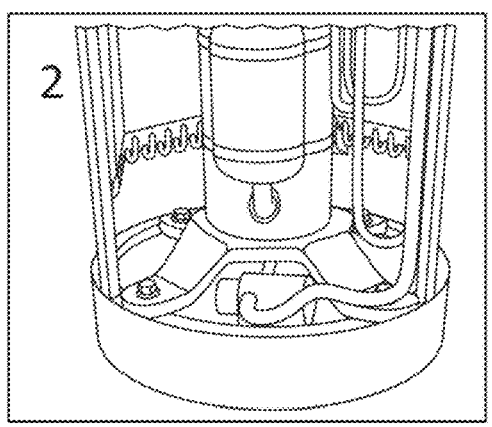
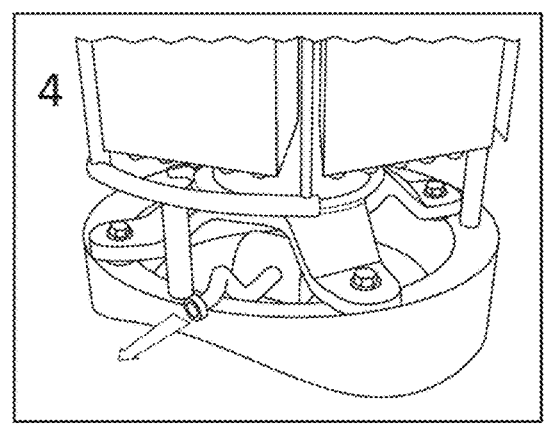
Fig. 9e  Fig. 9f

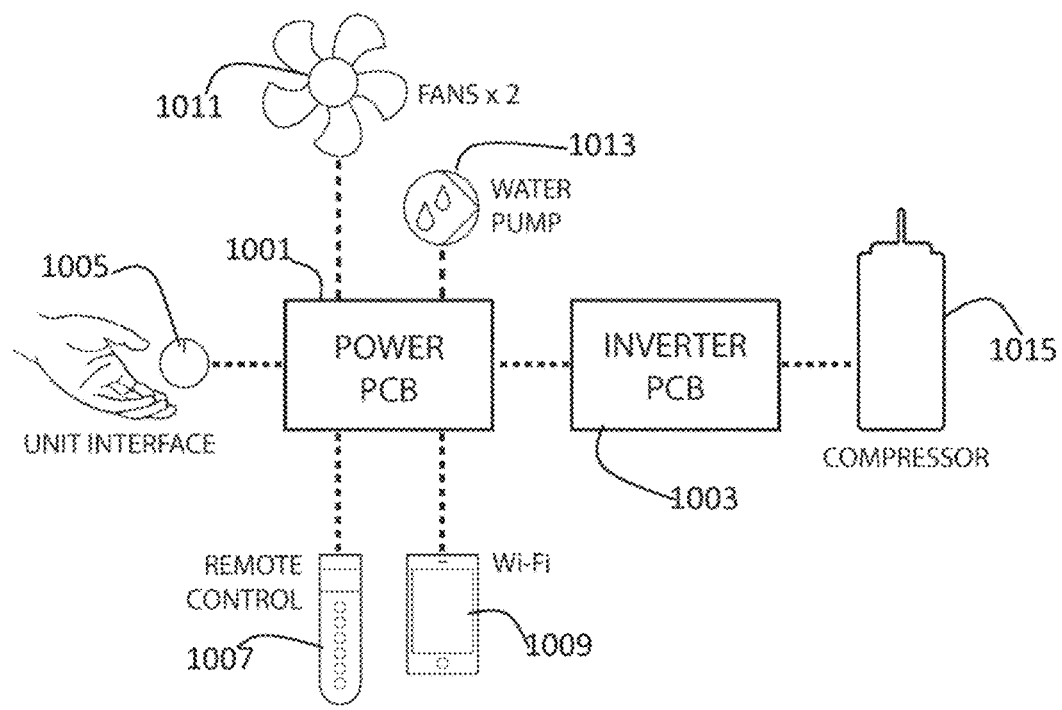
Fig. 10
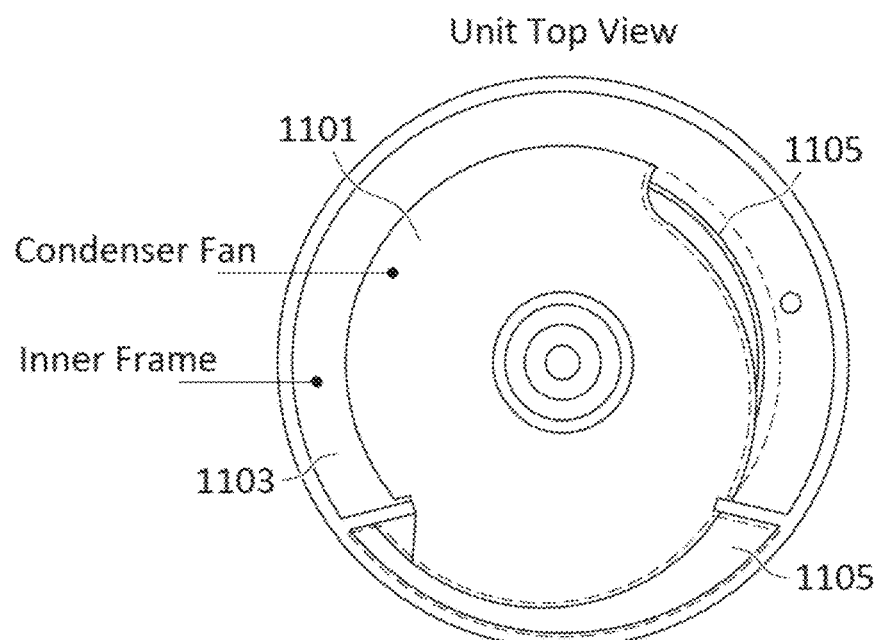
  Coil & Cord Passage Space

Exhaust Air Flow

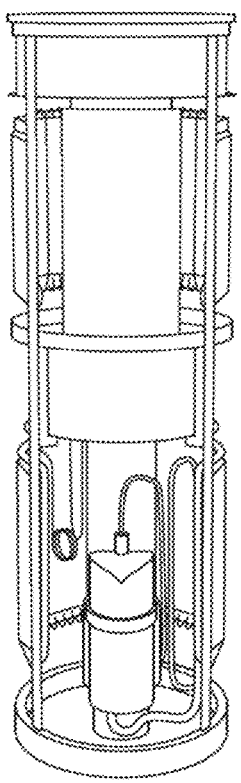
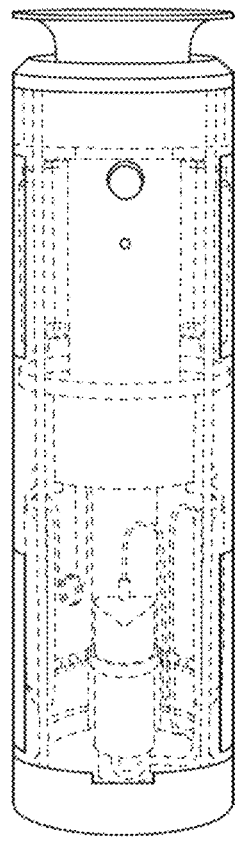
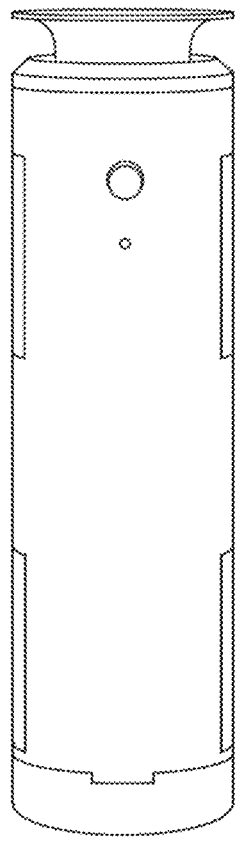
Fig. 19a
Fig. 19b
Fig. 19c

AIR-CONDITIONER

TECHNICAL FIELD

The present disclosure relates to an air-conditioner. In particular the present disclosure relates to a portable air-conditioner.

BACKGROUND

Air conditioning is a collective expression for conditioning air into a desired state. It could be heating the air during cold periods, cooling the air during warmer periods or for cleaning the air if it contains unwanted particles. However, the expression air conditioning is most often used when emphasizing cooling. As a product, air conditioners can look and be used in various ways, but they all share the same basic technology.

Today, portable air-conditioners are gaining more and more interest. Thus, a portable air conditioner is based on the more flexible life style of today, where the demand for being able to choose when and where to use an air conditioner is becoming a more important factor for the users. In countries that experience climate differences over the year, it is a benefit to be able to remove the air conditioner when cooling is not necessary anymore. Also, a permanently installed air conditioner requires modifications within the house which means extra effort and costs.

Existing portable air-conditioners are often found to be large, hard to handle, noisy and inefficient. Furthermore, the connected exhaust air outlet that removes the heat from the room is often complicated and inefficient in its design. A known portable air-conditioner is for example described in the U.S. Pat. No. 2,234,753.

Hence, there is a need for an improved air-conditioner.

SUMMARY

It is an object of the present invention to provide an improved air-conditioner that at least partly solves the problems with existing air-conditioners, in particular problems of portable air-conditioners.

This object and others are obtained by the portable air conditioner as set out in the appended claims. Also disclosed are devices that can be used together with portable air-conditioners.

In accordance with one aspect a portable air-conditioner is provided. The air-conditioner comprises a compressor, a condenser, an evaporator, and typically also comprises an expansion device located inside a housing. The air conditioner further comprises a cool air outlet and a warm air outlet. The housing of the air-conditioner has an elongated shape, the end sections of the elongated air conditioner housing forming the top section and bottom section, respectively. In particular an axial fan can be used as an evaporator fan and a radial fan can be as a condenser fan in order to keep dimensions down while at the same time providing an air-conditioner unit that has a sufficiently high capacity. Hereby an efficient use of floor space can be achieved.

In accordance with some embodiments the portable air conditioner is generally cylindrical or cuboid shaped. In accordance with some embodiments the bottom section has a diameter of less than 45 centimeters and the height of the portable air conditioner is at least 80 centimeters.

In accordance with some embodiments the cool air outlet is located in the top section and the portable air conditioner is adapted to generate a cool air stream in an upwards direction.

In accordance with some embodiments the portable air conditioner is provided with a shield for deflecting the upwards cool air stream in a radial direction. The deflecting shield can be designed to only deflect the radially deflected cool air into a sector. The shield can be generally cone shaped with a curved wall or with a straight channel outlet. The shield design can also be provided with an opening in the middle for letting air pass in an upwards direction.

In accordance with some embodiments the compressor is located in the bottom section of the housing of the portable air conditioner and the housing has dimensions such that the base of compressor fits therein and occupies the entire base of the housing. The compressor can be surrounded by the condenser. In accordance with one embodiment the condenser is elevated such that it only surrounds the upper section of the compressor and such that the space between the lower part of the compressor and the housing is not occupied by the condenser. Hereby the flow of air in the air-conditioner can be improved. Above the compressor a radial fan to expel warm air can be located. Above the radial fan the evaporator can be located. Electronics can be located in the area of the evaporator. On top of the evaporator an axial fan can be located.

In accordance with one aspect a compressor cover is provided. The compressor cover has holes for the coils and a cut in between and along the sides of the compressor cover. The cover can have a cut horizontally in order to serve as a passage of the thermal cord when mounting the cover. The cover can be provided with one or more, in particular two, fabric straps that fixate and lock the cover in place by Velcro.

In accordance with one aspect a portable air-conditioner is provided. The portable air-conditioner comprises a compressor, a condenser, an evaporator, and can also comprise an expansion device located inside a housing. The portable air conditioner further comprises a cool air outlet and a warm air outlet. The housing of the air-conditioner has an elongated shape. The end sections of the elongated air conditioner housing form the top section and bottom section. The evaporator and the condenser are located wrapped around the inner side of the air conditioner housing.

In accordance with some embodiments the fins of the evaporator and condenser are horizontal. The fins can be tilted.

In accordance with one aspect an exhaust air outlet assembly for a portable air conditioner is provided. The assembly comprises an inflatable hose. The hose in some embodiments has outlet holes for the warm air from the room on one side thereof. The inflatable hose can be manufactured from a relative stiff material in a section to cover a window gap. The assembly can also be assembled of two parts; one inflatable hose and one extendible adapter for covering the window gap of an open window. The exhaust air outlet in the adapter can comprise a stiff bottom member that functions as an adapter to the inflatable hose that connects to the air conditioner. The adapter can have an integrated spiral shaped metal wire which enables the use in different window sizes.

The inflatable hose can be manufactured from flexible and light materials, like fabrics or flexible plastics, and designed to insulate the noise and heat from the hot air outlet stream.

The profile of the inflatable hose can be made circular, oval or rectangular. The hose can be extendable, easy to manage and store. It can have an integrated spiral shaped metal wire which enables the use in different window sizes. In particular the spiral can be fitted in one end of the hose to provide an adapter in that end of the hose. The exhaust air outlet assembly can comprise a stiff bottom member that functions as an adapter to the inflatable hose that connects to the air conditioner. The member can be integrated in the hose or provided as a separate member that can be assembled with the hose.

In accordance with one aspect an air filter assembly is provided. The air filter assembly can be adapted to run in a rail on the housing of a portable air conditioner. The air filter assembly can comprise a handle connected to a fixating frame. The fixating frame has a filter mounted thereon.

In accordance with some embodiments the air filter assembly further comprises a directing bar connected to the front part of the fixating frame.

In accordance with some embodiments the handle can be connected to two fixating frames, where the frames are designed to move in opposite directions during insertion of the air filter assembly.

BRIEF DESCRIPTION OF THE DRAWINGS

The present invention will now be described in more detail by way of non-limiting examples and with reference to the accompanying drawings, in which:

FIGS. 8 and 9a-9f depict a self-evaporator system,

FIGS. 10-12 illustrate air-conditioner electronics and location thereof,

FIGS. 19a-19c illustrate a possible design of a portable air-conditioner unit.

DETAILED DESCRIPTION

Figure 1:
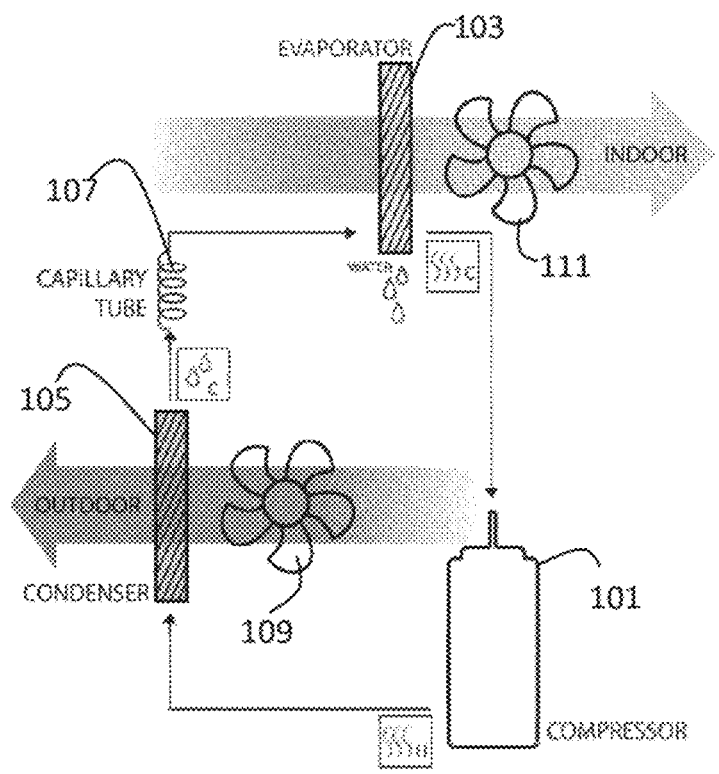
FIG. 1 illustrates the principles of an air-conditioner.

FIG. 1 illustrates the general principles of an air conditioner system. The main parts of the system are the compressor 101, evaporator 103, condenser 105, and expansion device 107 such as a capillary tube. Also a condenser fan 109 and an evaporator fan 111 can be provided. The compressor is connected in a circuit with the condenser, the evaporator, and the expansion device. The refrigerant has the ability to turn from liquid into vapor, and by that change in temperature. The tempered refrigerant and the indoor air work in symbiosis to exchange heat to each other.

The process can be described in the following stages:

Stage 1—Compressor

In the compressor, the refrigerant enters as a superheated vapor at a low pressure. By experiencing a high pressure in the compressor, the refrigerant receives a higher temperature, and thereby exiting the compressor as a warmer vapor.

Stage 2—Condenser

The refrigerant vapor at high pressure and temperature enters the condenser which is known as the warm part of the air conditioner. An air stream is flown over the condenser in order to cool the condenser down. When the hot vapor refrigerant gets cooled down, it condensates and the heat of the refrigerant is transferred to the air flow. The condensed refrigerant is subcooled with part of the energy released to the environment, and then passing through the expansion device, where it experiences a reduction of pressure. This pressure reduction leads to a drastic temperature drop of the refrigerant.

Stage 3—Evaporator

The cool refrigerant enters the evaporator as a mixture of vapor and liquid a low pressure and temperature, known as the cool part of the air conditioner, where hot indoor air is blown through by a fan. The indoor air then turns cooler while the refrigerant in a mixture of vapor-liquid evaporates further since it absorbs the heat from the hot air.

When the air temperature decreases on its way through the evaporator, the water vapor contained in the air condensates and then a film of liquid water is produced in the evaporator surface. This means that the air conditioner actually can dry the air while cooling it. After the evaporator, the superheated refrigerant is sucked into the compressor again where the cycle restarts.

In a portable air-conditioner all the components are assembled in one unit. Since the entire unit is indoors, it requires an exhaust air outlet to remove the heat. An exhaust air hose is connected to the outside typically through a window or similar. The purpose of a portable air conditioner is to cool a volume of air with no need for modification in the residence. The portable air-conditioner unit is flexible since it can be moved to areas where the cooling is preferred without major effort for installment.

Since the unit constantly sucks in indoor air, the air intakes are usually equipped with filters in order to collect dust and particles from the air. This facilitates sustainability of the inner components as well as cleans the indoor air. The filters are usually recommended to be cleaned every two weeks. When the hot indoor air flows through the evaporator and becomes colder, condensate is created in the evaporator and is often used to cool the condenser further. Parts of the condense water will at that time be evaporated by the heat of the condenser and the system is then called self-evaporating. The condense water that not get evaporated has to be removed from the unit. This can either be done through water trays that have to be emptied continuously or via water drainage outlets where a garden hose or similar can be connected. In another embodiment water tanks are used to collect water. The use of water tanks facilitates moving of the unit without the risk of spilling water. The self-evaporative system uses the condense water to cool down the condenser in order for the unit to be more efficient. This reduces the amount of condense water that needs to be drained from the unit or stored in the unit. In order for the condense water to be distributed over the condenser, the structure includes paths for the water to drain in along with a splashing fan in the bottom, splashing up water on the condenser.

Figure 2:
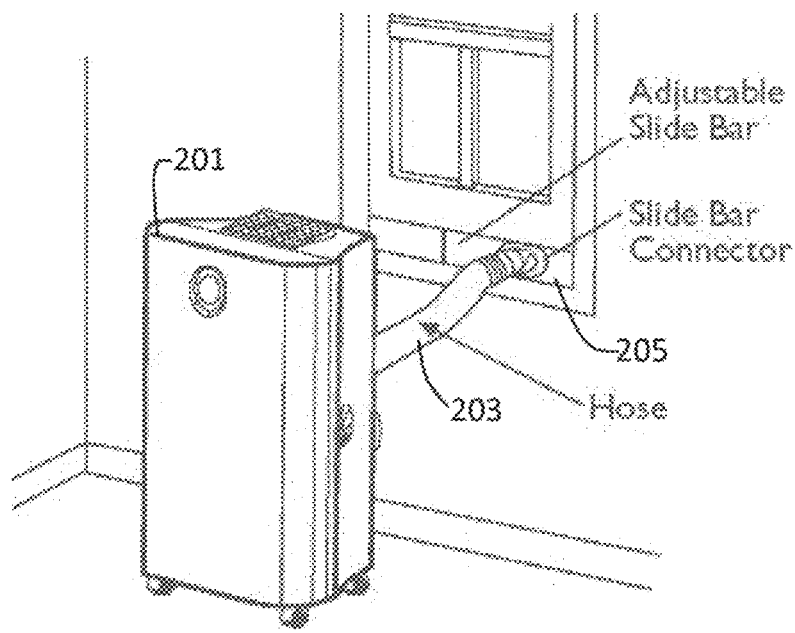
FIG. 2 illustrates a portable air-conditioner unit.

In FIG. 2 a portable air-conditioner 201 is shown. A portable air conditioner requires an exhaust air outlet. The exhaust air outlet functions as the exit for the heat that is removed from the indoor space. In order for the indoor air to stay cool, the heat needs to be removed from the indoor space. This is enabled by using an outlet device, typically a hose 203 that can be connected to the back of the unit. The hose is most often connected to a window where the hot air is exhausted as is illustrated in FIG. 2. A window mounting kit can also be included when a portable air conditioner is purchased. The window mounting kit can comprise an adapter 205 for mounting in the window. The adapter can be slidable to fit in different window sizes In order to provide a portable air conditioner that is easy to place in a room, typically in a home environment, a high, narrow portable air conditioner is provided. A high narrow portable air conditioner has the advantage that it is easy to place in a room due to the small floor area that it requires. Also, when a portable air conditioner that is built in an elongated shape such as a cylinder or cuboid, the cool air outlet can be placed in the top or upper section of the portable air conditioner, whereby the cool air can be distributed from a more centered location in the room which provides a better air flow due to rising heat. Also, a cylindrical or cuboid shape provides for a large front area while requiring a small floor space. As a result, an efficient air-conditioner having a relatively high capacity in relation to the required floor space can be provided when using a cylindrical or cuboid shape of the air-conditioner.

Figure 3A:
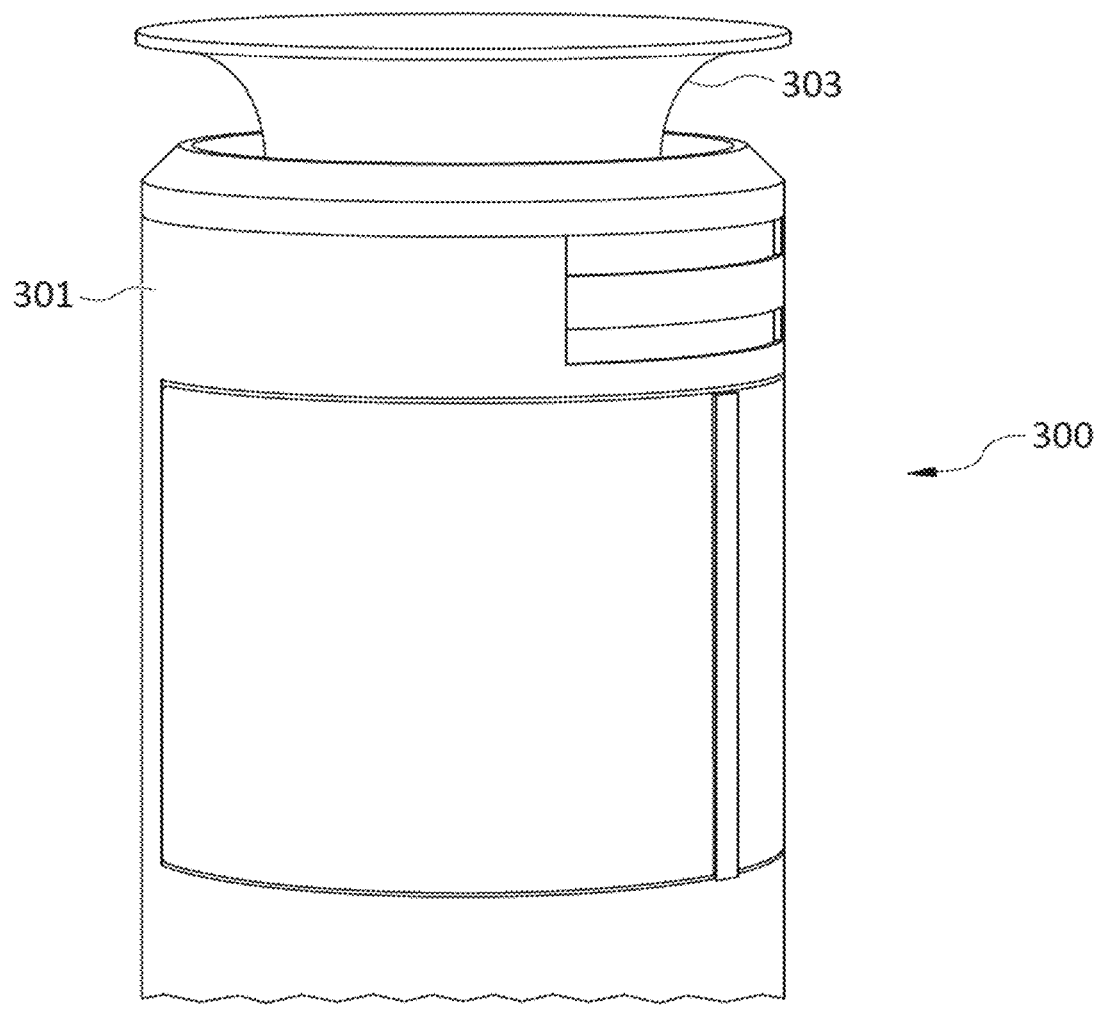
FIGS. 3a-3c illustrate a top of a portable air-conditioner unit.

In accordance with some embodiments the cool air is blown in an upwards direction in the elongated portable air conditioner. The upwards going cool air flow can be deflected, in whole or partly in a radial direction by a shield provided at the cool air outlet. In particular the radially deflected cool air stream can be deflected in an essentially half circular direction. Hence the radially deflected cool air stream can be deflected in a particular sector, where the sector for example can be essentially 180 degrees. In accordance with some embodiments the sector width can be adjustable for example by providing different deflecting shields that can be exchanged or by a sliding mechanism that can be provided to adjust the sector width. The shield can for example be provided as having a half circular opening and being generally curved shaped. This can be advantageous since it spreads the air in a wide increasing field and also has an effective direction of the air flow straight out in the room. In FIG. 3*a* a top section 301 of a generally cylindrical portable air conditioner 300 with a shield 303 for deflecting an up-going cool air flow in a radial direction is depicted.

Figure 3B:
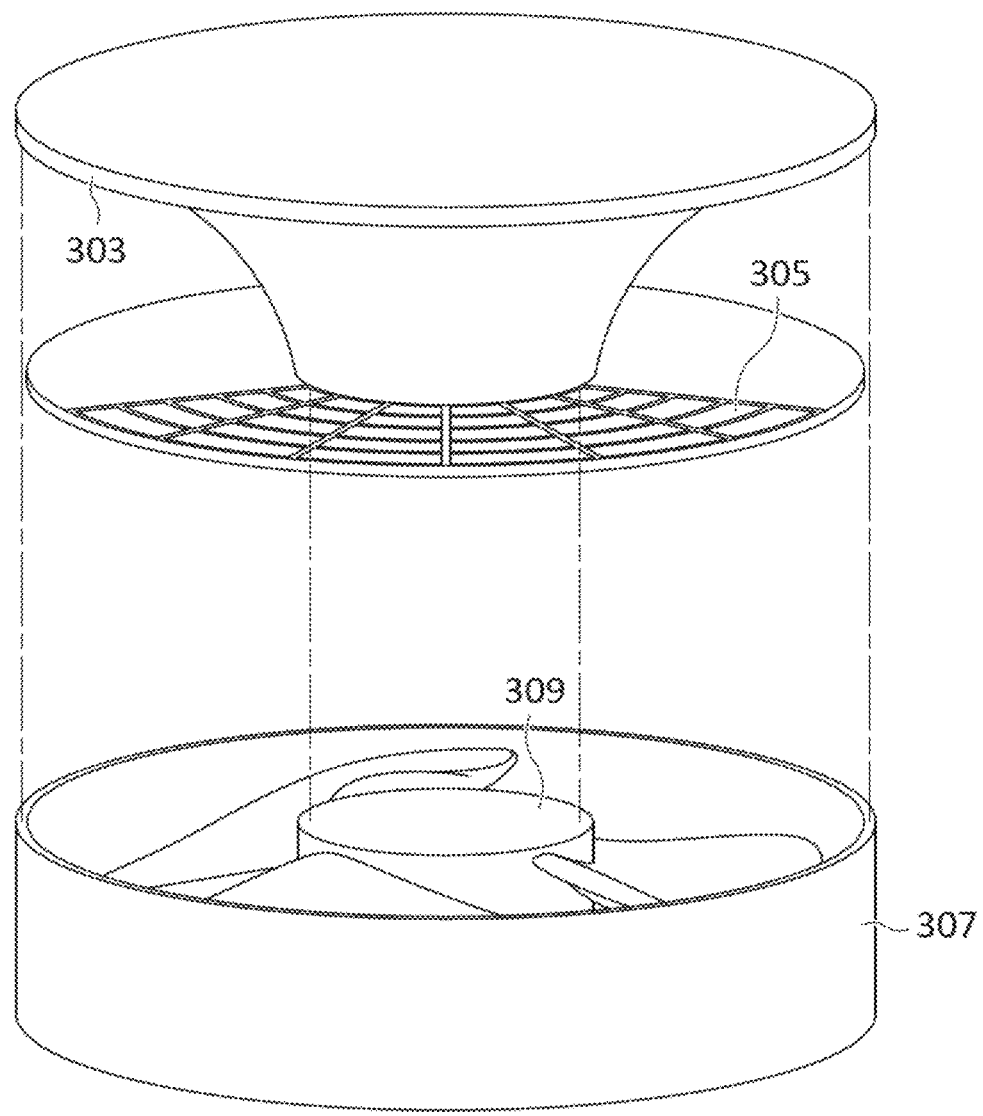
Figure 3C:
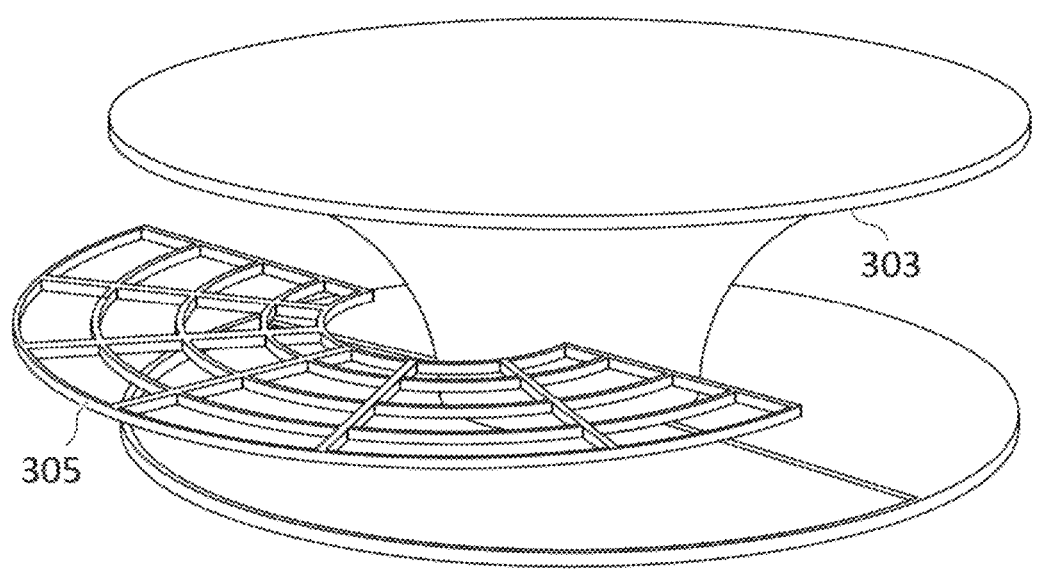

Further, FIG. 3*b* shows the shield 303 with air vents 305 beneath where the size and location of the air vents control the amount and direction of the radially deflected cool air. The shield can be cone shaped with a curved wall placed upside down, or a straight outlet channel. The generally cone shaped shield can have an opening in the bottom section to allow for some of the cool air to exit the portable air conditioner in an upwards direction and not be deflected by the shield. FIG. 3*b* further depicts an axial fan 307 and a fan motor 309 for driving the fan 307. In FIG. 3*c* an exemplary shield 303 as outlined above is depicted. As can be seen the air vent 305 can be separated from the shield for cleaning etc.

In case of a generally cylindrical shape of the housing of the portable air conditioner some additional advantages can be obtained, since most of the components in an air conditioner are naturally round, like the fans and the compressor. The heat exchangers could be possible to either bent or divided in sections around the inside of the unit. Thereby, space will not be wasted and the volume can be used more efficiently in the unit. An exemplary air-conditioner unit 400 is shown in FIG. 4.

Figure 4:
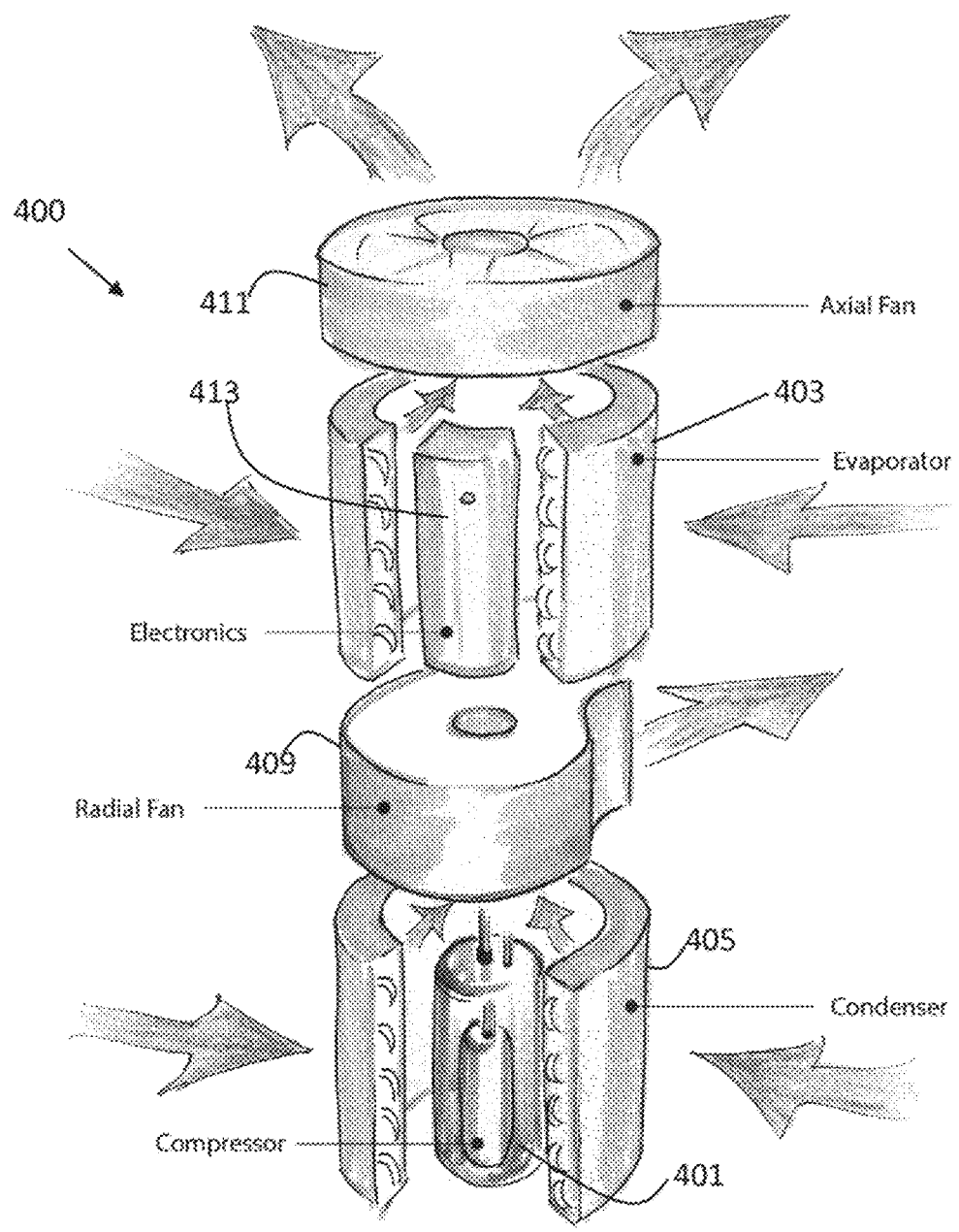
FIG. 4 illustrates a cylindrical air-conditioner unit.

As in any air conditioner assembly, the unit 400 as described in conjunction with FIG. 4 is divided into two main sections, one cool and one hot section. The cool section will include an evaporator 403 and an evaporator fan 411. The requirement for the cool section is that indoor air could be sucked in through the evaporator and then out in the room again. In accordance with embodiments described herein, the unit 400 typically generates an air flow of cool air upwards in a cylindrical or similar shaped housing. An axial fan can in some embodiments be used as the evaporator fan 411. Further, the evaporator coils of the evaporator are placed along the inner walls of the unit. This is a position where both the indoor air and the fan have easy access to them. In one embodiment electronics 413 of the unit is placed in the cool air flow in order to prevent overheating. Thus, the electronics 413 can be located surrounded by the evaporator 403. Hereby it can also be prevented that condense water drops down on the electronics 413. Also, the electronics 413 can be shielded from condense water from the evaporator in order to further prevent causing fires, failures of the product or electric shocks.

The hot section of the portable air conditioner unit 400 has several voluminous components. A compressor 401 is in accordance with some embodiments placed at the center base. By placing the compressor 401 alone in the bottom section, the cylinder diameter can be minimized to essentially correspond to the width of the base of the compressor. Hence, the width of the compressor base is (essentially) the same as the inner diameter of the cylindrical housing. A condenser fan 409 has the requirement to suck indoor air in through a condenser coil of a condenser 405 and then send the air outdoors in a radial direction. This can be achieved by using a radial fan as the condenser fan 409.

Using the component assembly as depicted in FIG. 4, most of the main components evolve around the center of the cylinder and can thereby create a smaller, more compact air conditioner. It is to be noted that no self-evaporating system is depicted in the exemplary main component assembly of FIG. 4.

Further, a heat exchanger/air conditioner as described herein can have a generally circular bottom section, thereby forming a generally cylinder shaped unit 400. The unit 400 can consist of two fin and tube type heat exchangers, both of them manufactured with a cylindrical profile. This design can be made by means of the bending of standard flat coils in a cylindrical shape.

One of the main advantages of the cylindrical shape heat exchangers is the larger air-intake frontal area, in comparison to standard square shape designs. A larger frontal area permits the minimization of the air pressure drop through the heat exchangers, what means less friction and less pumping power in fans. This is also related to less noisy processes.

The cylindrical shape heat exchangers also offer the possibility of increase the overall heat transfer area by the increase of fins density. Additionally, in the cases when the air flow crossing through the heat exchanger is irregular, a proportional fin density in relation to non-uniform air distribution can also increase the capacity of the system, without a significant increment of the pressure drop.

Other important benefit of cylindrical shaped air-conditioner units, with larger air-intake frontal areas, is that the thickness of the heat exchanger can be reduced, allowing low temperature differences between the inlet and outlet of the air, in both condenser and evaporator. As a consequence, higher efficient cycles can be obtained because of the effect of the increase of the evaporating temperatures and decrease of condensing temperatures. This means lower pressure rations in the compressor, and as a consequence less power consumption. Therefore, larger but thinner frontal area is more efficient than smaller but thicker frontal area.

Additionally, a lower air temperature difference in cylindrical shape evaporators can be essential to increase the sensible cooling capacity effect, by means of the minimization of the energy used to condensate the moisture contained in the air. If the air temperature difference in the evaporator is lower, the relative humidity change is also lower. Therefore, the amount of moisture removed over the evaporator surface is less, as well as the energy required for this process.

Another advantage of the cylindrical design of the heat exchangers is the simplification of circuiting design as well as the manufacturing process, since the number of junctions between circuits can be reduced drastically, because of a better distribution of the refrigerant into the pipes.

The use of cylindrical shape heat exchangers can allow a better refrigerant distribution inside the refrigerant circuiting due to the lower pressure drops in refrigerant side, since there is not needed a complex circuitry to maximize the air conditioner performance.

From the air side point of view, the use of cylindrical shape heat exchangers is also an advantage to fully use the heat exchanger area, since the distribution of the air flow is more efficient along the heat exchangers surface. This feature is very important because allows to maximize the heat exchangers performance, without wasting part of the material used in their manufacture, as happens in most of the standard heat exchangers.

Compressor

Any type of compressor can be used. However, in some embodiments an inverter compressor is preferred. An inverter compressor keeps a more energy efficient work flow than a non-inverter type. In an air conditioner with a conventional compressor, the compressor will be turned off when the wanted room temperature is achieved. This means that the compressor constantly switches from running for maximal capacity to being completely off, which is an inefficient work method due to the energy consumption that is required in the switching on mode as well as the maximum speed modes. The inverter compressor is able to control the cooling output of the air conditioner through a variable-frequency drive with a power inverter that changes direct current (DC) to alternative current (AC). The compressor motor can therefore run at any frequency, providing an even work flow. Due to the evenness of work flow, and the reducing of the number of on/off cycles for the compressor, the noise level will decrease using an inverter compressor. An air conditioner which uses a conventional compressor, the constantly on/off switching as well as the maximum capacity mode will make distinct remarks in the total noise level of the air conditioner. The inverter controller can in accordance with some embodiments be placed in the cool part of the air conditioner. The other electronics can also be placed in the cool part of the air conditioner.

The compressor is placed on the air conditioners lowest point in order to minimize vibration transitions to the rest of the structure. Also, the compressor constitutes as the heaviest component which allows for a more stable construction with the compressor in the bottom.

By placing the main compressor body in the center of the cylindrical air conditioner, can allow for evenness of the incoming air flow since the distance between the condenser and compressor will be even around it.

Figure 5:
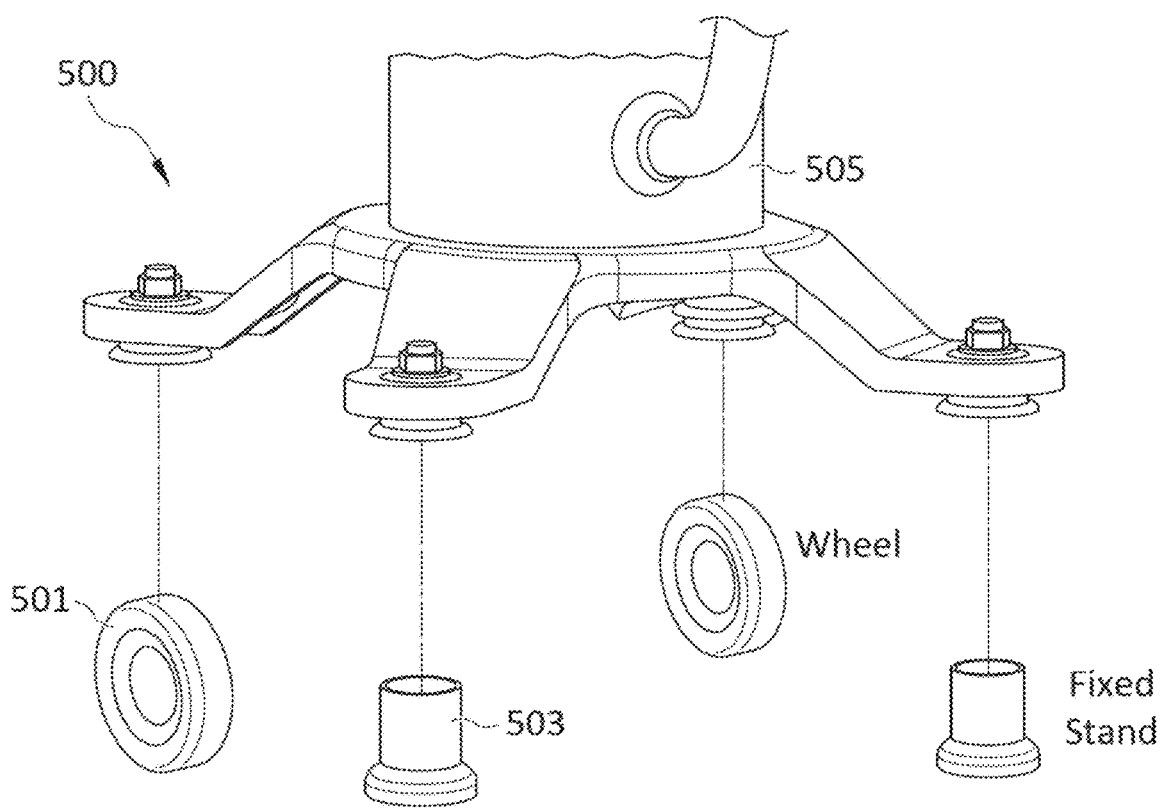
FIG. 5 illustrates a stand for a compressor.

Many compressor models use a triangular base with three feet. The stands are usually equipped with rubber feet in order to insulate the vibrations from the compressor. In FIG. 5 a compressor base 500 is depicted. To optimize the compressor base for location in a high elongated housing, a squared base is used in accordance with some embodiments. With a squared base with four stands, placed over the air conditioners four stands consisting of two wheels 501 and two fixed stands 503, the vibrations from a compressor 505 standing on stands will be transferred directly down to the ground. The stands 501; 503 of the compressor, regardless of the number of stands used, can be located on the outer periphery of the bottom section of the air-conditioner unit. The base can also be constructed so that the compressor is raised from the bottom, partly for using the height of the air conditioner. By having an elevated base, it also creates an opportunity to use the space underneath for condense water collection such as in a condense water tray or a condense water tank. The stands of the compressor can be located on the rim of the bottom section of the air-conditioner.

Compressor Cover

Figures 6A, 6B, 6C:
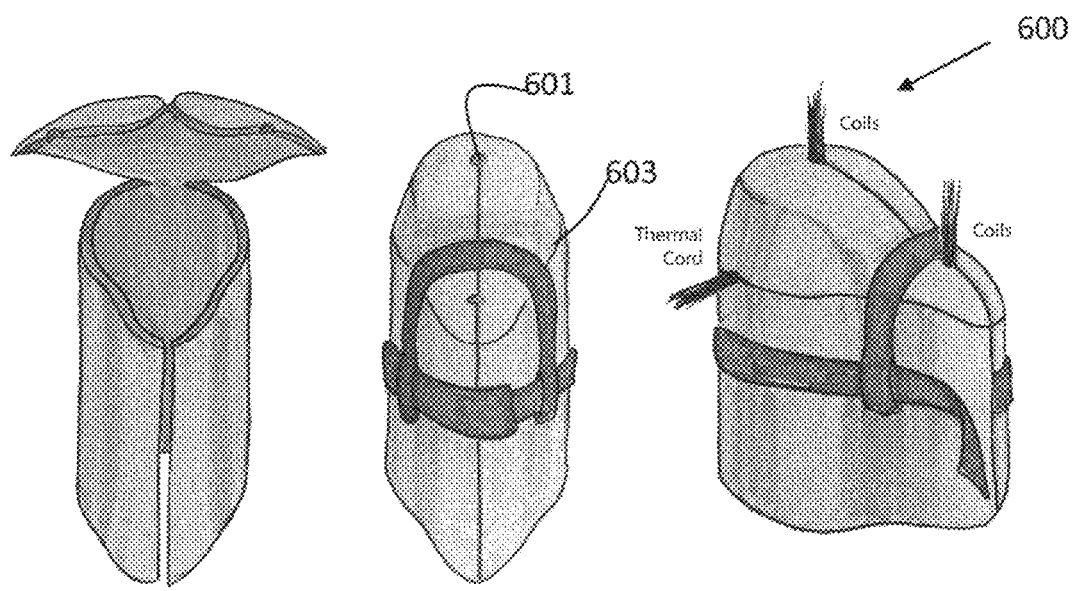
FIGS. 6a-6c illustrate a cover for a compressor.

In order to insulate the compressor, a cover can be provided. In FIG. 6 an exemplary cover 600 is shown in different views. In accordance with some embodiments the cover can be made of molded neoprene, and can be composed by different layers of noise isolation materials. The cover can have holes 601 for the coils and a cut in between and along the sides to be able to remove it from the compressor as is shown in FIG. 6. The cover can also have a cut 603 horizontally in order to enable passage of the thermal cord when mounting the cover. Around the cover, there can be one or more, in particular two, fabric straps 605 that fixate and lock the cover in place by Velcro. The cover can have an even material thickness that can allow the effective noise minimization from compressor. For example the thickness can be about 5 millimeters. The cover is adapted to suit different placements in vertical order of the accumulator. Also varying thermal cap placements are considered due to the extra volume in the top of the cover.

Heat Exchangers

The heat exchangers in an air conditioner unit consist of an evaporator and a condenser. These two components are typically constructed in the same way, consisting of coils, usually made of copper, and mechanically pressed on fins. The fins are made of a heat conductive material (often aluminum) and their purpose is to enlarge the total surface area for the heat exchanger in order to expose the air flow to more heat/coldness.

An additional design could be the use of aluminum micro channel heat exchangers, manufactured in a cylindrical shape.

In a portable air conditioner having a high elongated shape both the evaporator and the condenser can be placed in the same framework, wrapped around the inner side of the air conditioner chassis/housing, with an air suction coming from above.

Figure 7A:
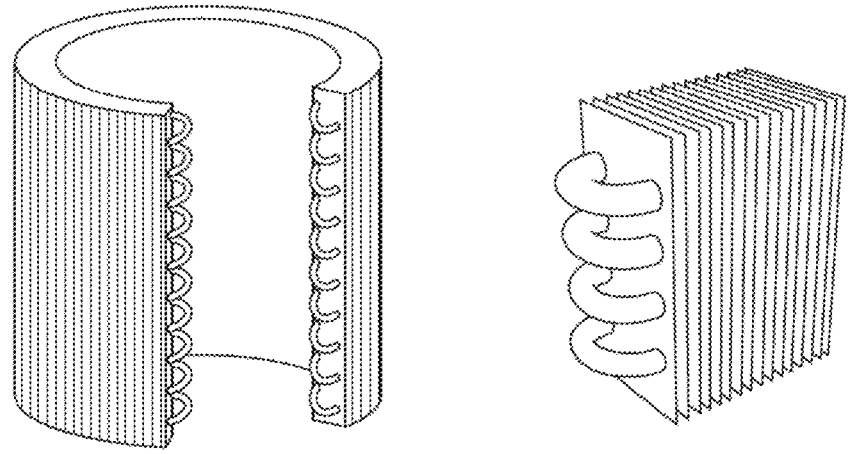
FIGS. 7a-7c depict heat exchangers geometry.
Figure 7B:
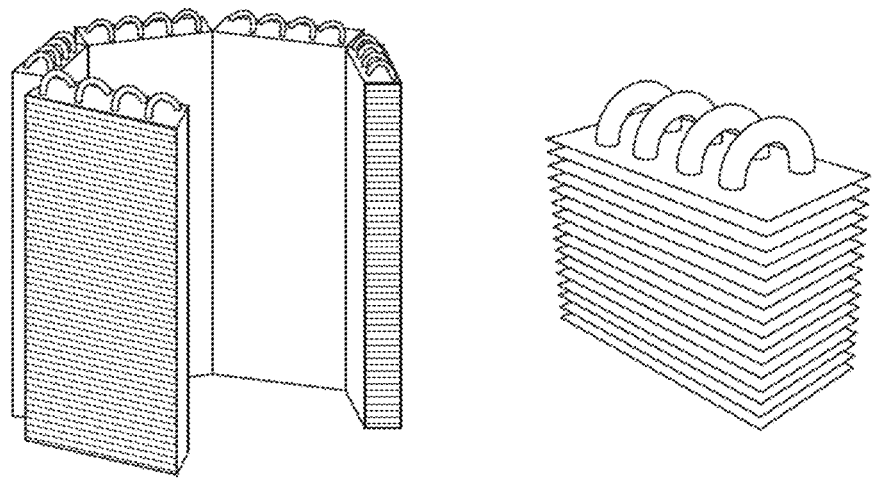
Figure 7C:
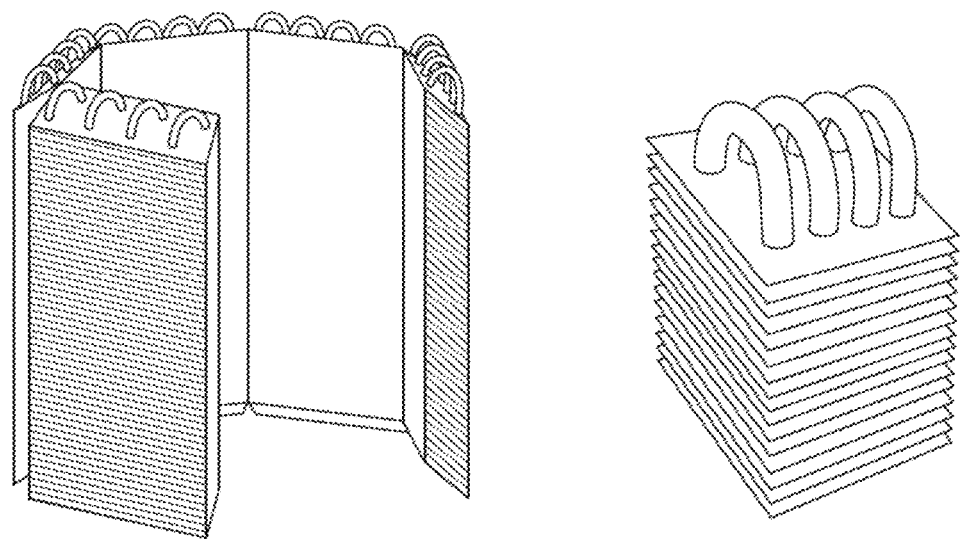

In accordance with one embodiment, the design of both heat exchangers comprises two fin and tube heat exchangers with a cylindrical profile. The design is possible due to bend the coils in a circular shape. FIGS. 7a-7c depict aspects of the heat exchangers geometry.

The cylindrical shape of both heat exchangers allows larger air-intake frontal areas in comparison to standard square shape heat exchangers. A larger frontal area allows the minimization of the air pressure drop through the heat exchangers, allowing the use of small fan motors and also minimizing the noise due to large air flow rates.

Additionally, the circuit design as well as the manufacturing process could be simpler, since the number of junctions can be reduced drastically. This can be obtained in different ways. FIGS. 7a and 7b show two possible designs. Thus, FIG. 7a shows a vertical fin placement and FIG. 7b shows a horizontal fin placement. An advantage of using horizontally placed fins in a portable air conditioner that is high and has an elongated housing where the evaporator and/or the condenser is located wrapped around the inner side of the air conditioner chassis/housing is that the horizontal fin design will probably give a more even air flow than the vertical fin placement. This is because the horizontally placed fins will split up the air in vertical order and direct it to the middle of the air conditioner, where an under pressure will be occurring due to the suction from the fan. The vertical fins does not direct the air straight into the air conditioner in the same way since it is creating vertical gaps that leads the air up to the fan directly. Also horizontally placed fins provide a more even air flow over the heat exchanger area, and therefore it can be stated that this design uses the entire frontal area more efficiently than the vertical fin design does.

In another embodiment the horizontal fins are tiled. This is depicted in FIG. 7c. Using a tilted fin design will allow for condense water to rinse off easier and also to direct the air flow towards the fan, which is advantageous. Also by using tilted fins the fin surface area will increase without increasing the depth. For example if the heat exchanger design tilts with 45 degrees, a surface gain of 40 percent will be achieved compared to a horizontal design with the same volume.

Fans

There are typically two fans in a portable air conditioner; the evaporator fan and the condenser fan. The evaporator fan function is to force the hot indoor air over the chilled evaporator coils in order to cool it and then distribute it to the room again. The condenser fan force indoor air through the hot condenser in order to cool down the refrigerant and simultaneously give up the refrigerant heat to the exhaust air flow.

Generally fans can be split up into three major types, axial fans, radial fans and cross-flow fans. Axial fans, often called propeller fans, imbibe air on one side along its axis and exhaust it on the other side. Radial fans imbibe air along its axis but exhaust it in a radial direction. The radial fans are most often covered with a housing in order to direct the air effectively. In a cross flow fan, the air flows across the impeller. In existing portable air conditioners, both the fans are of either radial or cross flow type.

In the portable air conditioner as described herein, which has a high elongated shape; an axial fan is used as evaporator fan. In the case of an axial fan, the air come from underneath and it is exhausted in upwards direction, or with a certain angle to improve the air distribution. This is advantageous because it lets the air in from underneath and exhausts it upwards. Furthermore, the natural shape of an axial fan in combination with the placement uses the elongated shape well. In case the portable air conditioner shape is cylindrical the use of space will be optimal. In particular the required floor space can be reduced for the air-conditioner if the air-conditioner is made in a cylindrical shape with an axial fan as the evaporator fan.

The condenser fan on the other hand is advantageously of radial type since it is desired to imbibe air from underneath and exhaust it from the air conditioner in a radial direction. In particular if portable air conditioner housing is cylindrical when the condenser fan is placed with its axis vertically, it uses the cylindrical shape of the air conditioner in an efficient way.

By using an axial fan as the evaporator fan in a cylindrical air conditioner housing, the floor space is efficiently used, and amount of wasted space is minimal. The placement and fan type allows for large fan blades, which constitutes to a lower required fan speed, and thereby less energy consumption. The radial condenser fan is advantageously placed with its axis centralized in the air conditioner. By centralizing the axis, the air flow over the condenser can be imbibed evenly.

The shell reminiscent housing is in favor to the design since it leaves required space for cords and coils between the upper and lower air conditioner side.

Self-Evaporation

Self-evaporative systems are becoming a more common feature in air conditioners today, since the system increases the efficiency of the air conditioner and at the same time decreases the amount of condense water that otherwise have to be emptied often. The system uses the condense water that is created over the evaporator when the hot air becomes cold, for cooling the condenser. This increases the efficiency of the unit. The condense water can typically splashed onto the condenser from underneath by a small fan. When exposing the water for the warm condenser, the water evaporates and is sent to outside by the exhaust air flow, which reduces the amount of condense water that has to be emptied from the tray. An ideal self-evaporative system would evaporate the entire amount of condense water so no water emptying is required at all. It is also possible to supplement the self-evaporation system with a water tank whereby some water can be collected if it is not possible to self-evaporate all water at a particular time.

Figure 8:
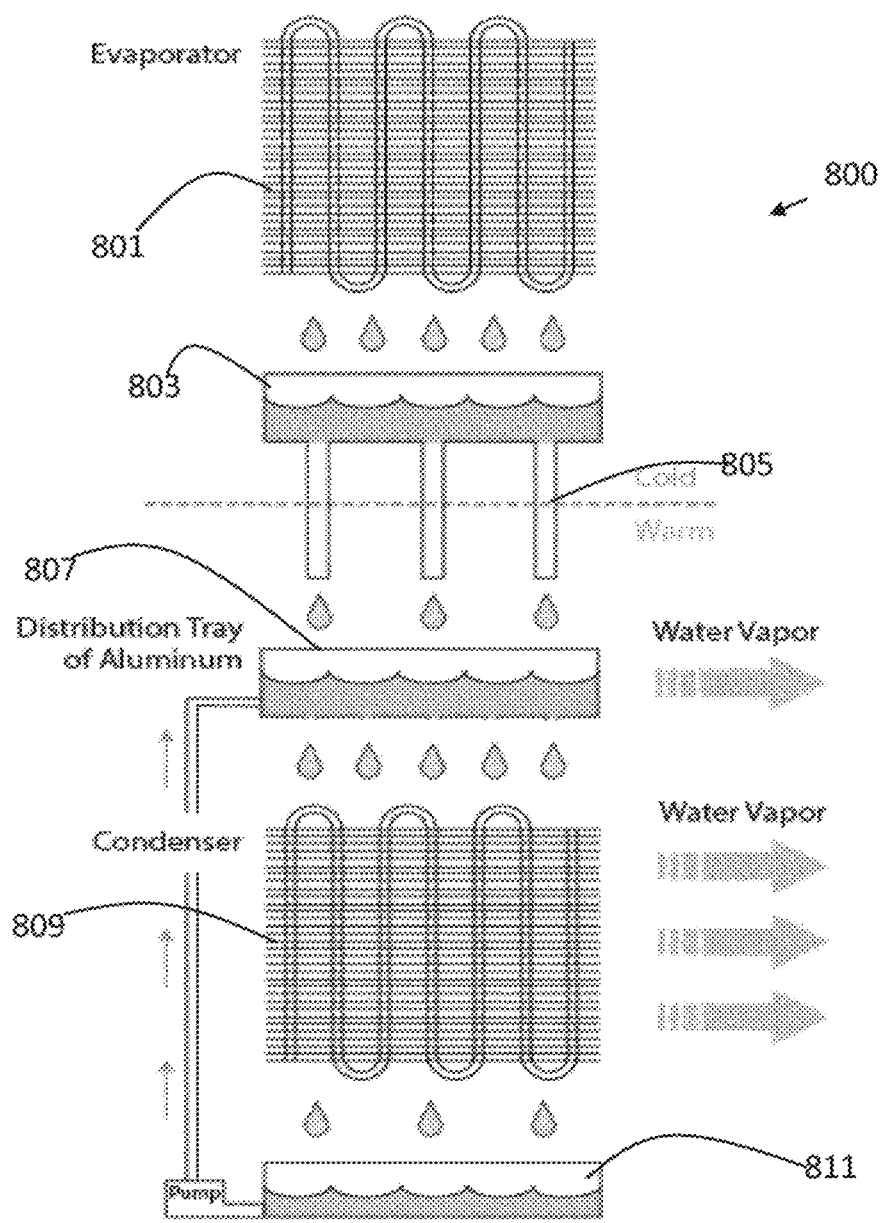

In FIG. 8 a self-evaporating system 800 is schematically shown. In accordance with some embodiments described herein the self-evaporating system uses the condense water that is created in the evaporator 801. This water is collected in an integrated tray 803 in the inner frame between the cold and the warm section of the air conditioner. The tray can be angled in order to direct the water to a pipe 805 that transports the water down to the warm side. From the pipe, the water is dripped down to a tray 807. By using an aluminum tray with a thin material thickness the tray 807 can absorb heat from the condenser and by that facilitate the condense water evaporation and the self-evaporative process will be further optimized. The aluminum tray is placed over a condenser 809 in order to absorb heat from it and to distribute the condense water over it. Due to the shape of the aluminum tray, the water will be filled up before it starts to drip down on the condenser. In the bottom of the air conditioner another tray or a tank 811 is integrated in the base plate where a water pump is mounted in the lowest point in order to pump up the remaining condense water to the aluminum tray again.

Even if the self-evaporating system would work ideally and evaporate the entire amount of the produced condense water, the air conditioner typically still would require a water outlet or a water tank to operate in a dehumidifier mode. This is due to the fact that the exhaust hose is dismounted in this mode in order to avoid a temperature change in the room. This means that a garden hose or similar is required to be connected with the water tray outlet when using a dehumidifying feature, see reference numeral 4 in FIG. 9.

FIG. 9 illustrates a self-evaporating system. Reference numeral 1 shows how the condense water is collected from the evaporator and then transported down to an aluminum tray where the water is collected and then distributed over the condenser. Reference numeral 2 illustrates how a water pump, placed on the lowest point under the compressor, pumps the water back up to the aluminum tray at reference numeral 3. Reference numeral 4 shows how the pump also is connected to the unit back where a garden hose can be connected during a dehumidifier mode.

Electronics Assemblage

The electronics assemblage typically gathers all the controls and other electronics in one unit in order to have easy access to them in maintaining occasions. A schematic figure of the connected elements in the electronics unit is shown in FIG. 10. The required main content that needs to be included in the electronics assemblage is typically a power PCB (Printed Circuit Board) 1001 and possibly an inverter PCB 1003. The power PCB is connected to all the control elements of the unit, such as a unit interface 1005, a remote control 1007 and a Wi-Fi controller 1009 that can comprise a SIM-card (Subscriber Identity Module). The power PCB 1001 also connects and controls the motorized components of the air conditioner unit, such as fans 1011, a water pump 1013 and a compressor 1015. Since the design can include an inverter compressor, the electronics can also demand an inverter PCB 1003 that could be referred to as an extra PCB.

Figure 11:

The electronics and in particular an inverter PCB 1003 dissipates a lot of heat, the electronics is advantageously located in the cool section of the air conditioner where the air flow from the evaporator will pass the electronics. The placement of the electronics in the cool section also matches well with a desirable elevated user interface placement in the front of the air conditioner. Another advantageous aspect is that the electronics assemblage will not risk getting in contact with moist since it will not be placed under any heat exchangers where condense water could drip down on it. Cords and coils from the lower part of the air conditioner will have to pass the condenser fan in order to reach the evaporator and the electronics box. The passage space is depicted in FIG. 11 where the condenser fan 1101 and the inner frame 1103 are shown from above with marked space 1105 for coil and cord passage.

Figure 12:
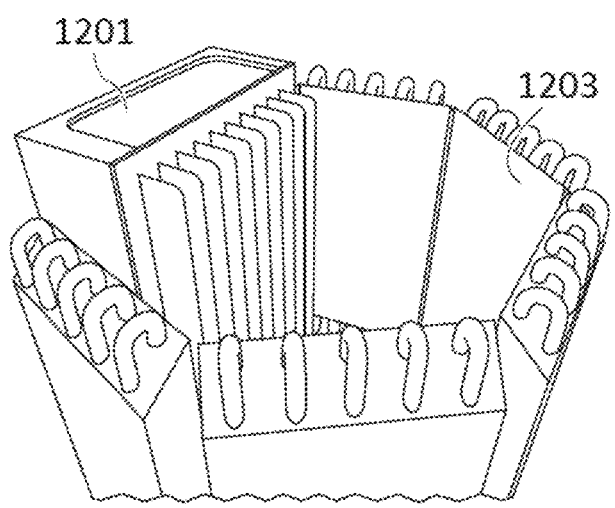

FIG. 12 illustrates the placement of the electronics 1201 in the cool part of the air conditioner in order to absorb cold from the air flow from the evaporator 1203 that at least partly can surround the electronics.

Exhaust Air Outlet

The exhaust air outlet system is an important component in the portable air conditioner since it functions as an exit for the heat that is removed from the warm indoor air in order to make it cooler. The indoor air is forced over the condenser, and the condenser will thereby get cooler. Simultaneously the indoor air absorbs heat from the condenser and removes it to outside. The air is removed outside by the air outlet system. Since the air outlet often is installed in a window, it is important to seal the window gap in order to insulate it from hot air coming in from outside, which would decrease the efficiency of the air conditioner.

In accordance with some embodiments the exhaust air outlet comprises an inflatable hose and an extendable adapter which covers the window gap. The extendable adapter can be integrated in the hose or can be provided as a separate part. Advantageously the inflatable hose is designed to minimize the window gap when the hose is placed through the window. In accordance with some embodiments the inflatable hose that also functions as the cover of the window gap. In such an embodiment there is no need for a separate adapter. On the outside part of the hose there are outlet holes for the hot air from the room. It is fixated in the window gap when the hose is expanding.

Figure 13A:
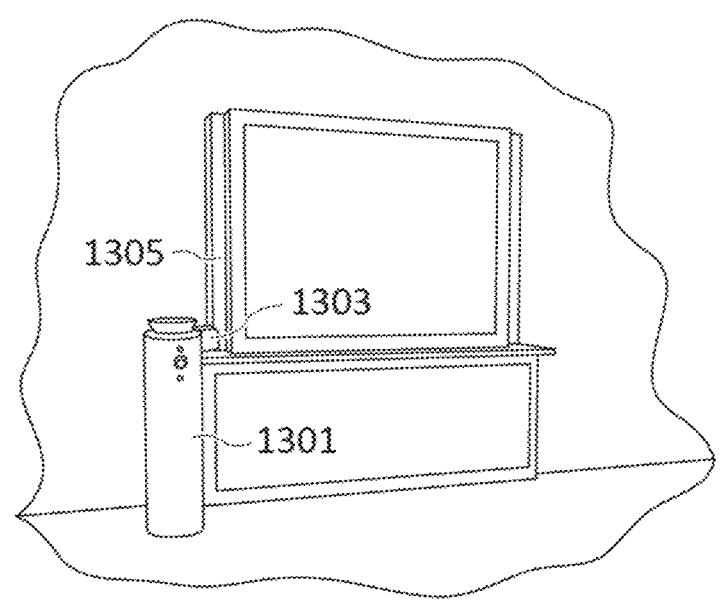
FIGS. 13a-13c and 14a-14b illustrate an inflatable hose and different connection possibilities thereof.
Figure 13B:
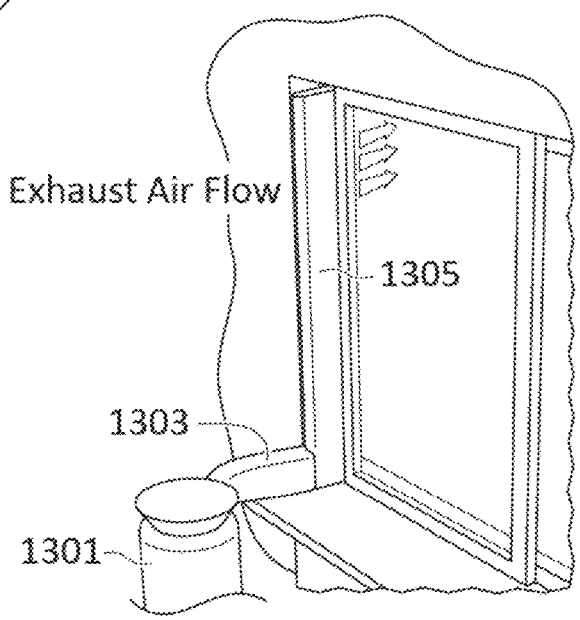
Figure 13C:
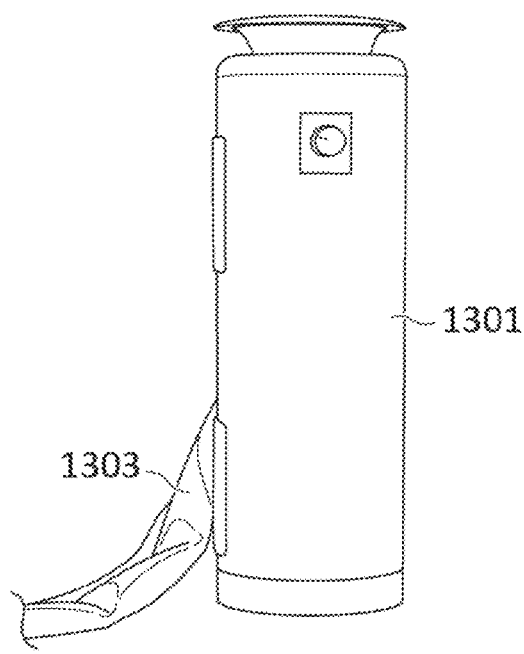

During the air conditioning process, the compressor and condenser fan shuts off when the desired room temperature is reached and only the evaporator fan keeps running. This means that the inflatable hose can tend to collapse since no air is any longer filling it up. When the room temperature raises again, the compressor and condenser fan switches on again. To reduce this problem the inflatable hose can be manufactured from a relative stiff material in between the window gap, but could still use the inflatable hose from the window connection to the air conditioner in order to maintain the discrete look that it will hold when not inflated. In accordance with some embodiments the profile of the inflatable hose is made oval through the entire hose system. Hypothetically, a narrower hose profile should not mean that the condenser fan would have to work harder as long as it keeps the same profile area as the required circular profile. This is illustrated in FIG. 13. FIG. 13 depicts an air conditioner unit 1301 having an inflatable hose 1303 in different views. The hose can be oval shaped. The hose can have an integrated flexible section 1305 or have a separate flexible window adapter that can be connected to the inflatable hose. A separate window adapter can be connected to the inflatable hose with a 90 degree connector or a 90 degree bend can be provided in a hose next to the flexible section 1305. In some embodiments the hose is oval only in the section adapted to cover the window gap. The hose can also have other profiles such as a circular or rectangular profile.

Figure 14A:
Figure 14B:
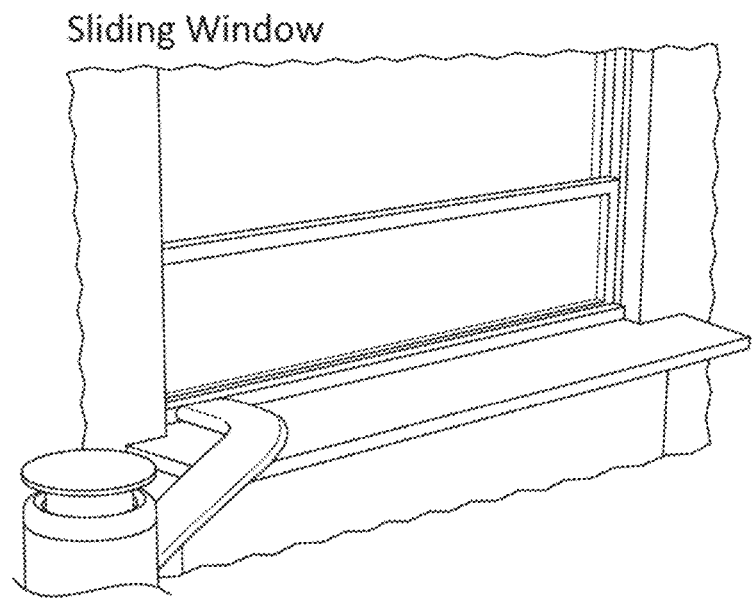

The extendable adapter can be connected to a stiff bottom that functions as an adapter to the inflatable hose that connects to the air conditioner unit. In accordance with some embodiments the inflatable hose can be provided with an integrated spiral shaped metal wire, in particular in an end-section of the inflatable hose, which enables the use in different window sizes. Since the hose from the window to the air conditioner is inflatable it will give a more discrete expression when installed in the room. The concept is suitable for both hinged and sliding window types, see FIGS. 14a and 14b, respectively.

Using a stiff bottom solves the problem that a 90 degree bend can cause when the entire hose was inflatable. Due to the adapter that connects the inflatable hose and the extendable hose, no air obstruction will occur other than that the air has to change direction.

The inflatable hose 1303 can be manufactured using flexible and light materials, like fabrics or flexible plastics, and designed to insulate the noise and heat from the hot air outlet stream. The section of the hose can be circular, elliptical or rectangular.

In accordance with some embodiments an extendable adapter and an inflatable hose are provided as separate parts. In case the extendable adapter 1305 is manufactured as a separate part that is assembled with the inflatable hose, the extendable adapter can be manufactured from the same material as the inflatable hose. However, in some embodiments the material of the extendable adapter is another than the material of the inflatable hose. In particular the extendable adapter can be made from a relative stiff material, stiffer than the material of the inflatable hose in between the window gap. The adapter 1305 can have a stiff bottom that functions as a connector between the inflatable hose and the extendable adapter.

The adapter 1305 can have a clamping mechanism between the window and the window frame, like some plastic hooks or rubber bands to ensure its right positioning and also the sealing of the window gap.

Component Assemblage

Figure 15:
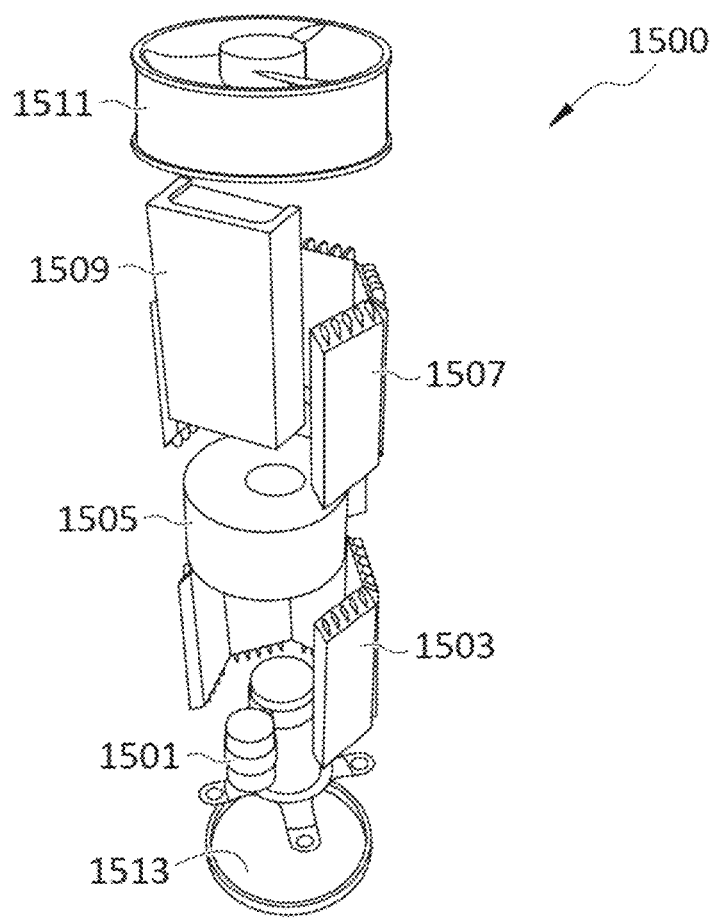
FIG. 15 shows how the different parts of an-air conditioner unit can be located.
Figure 16A:
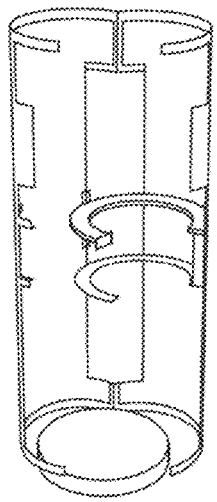
FIGS. 16a-16d show a hosing frame for a portable air-conditioner unit.
Figure 16B:
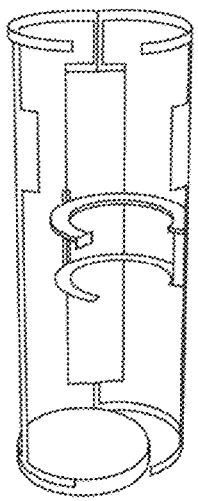
Figure 16C:
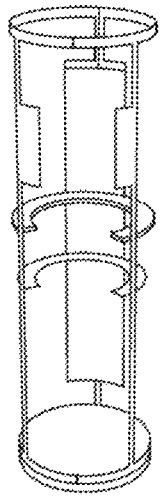
Figure 16D:
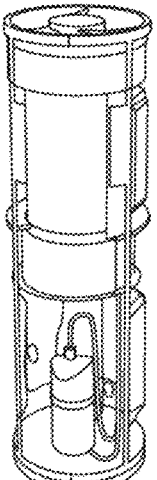

In FIG. 15 an exemplary assembly 1500 of the main components of a portable air conditioner that is high with has an elongated shape is depicted. In accordance with some embodiments a compressor 1501 is located in the bottom section of the housing of the portable air conditioner. The housing can have dimensions such that the base of compressor fits therein and occupies/stretches over the entire base of the housing. The compressor can be surrounded by a condenser 1503. The condenser can also be located to only surround the top portion of the compressor, thereby allowing for free air-flow in the bottom section of the compressor.

Above the compressor a radial fan 1505 to expel hot air can be located. Above the radial fan an evaporator 1507 can be located to cool air. As described above electronics 1509 can be located in the area of the evaporator 1507. On top of the evaporator an axial fan 1511 can be located to deliver cool air. A condense water tray or a water tank 1513 can be located under the compressor.

An assembly as described in conjunction with FIG. 15 allows for a portable air conditioner unit that occupies a small floor area and that generally has small dimensions. In accordance with one embodiment a portable air conditioner having a generally cylindrical shape can be formed. The cylindrical portable air conditioner can have a diameter less than 45 cm, in particular about 30 cm and a height larger than 80 cm, in particular about 115 cm. In some embodiments the ratio of the width/height of the portable air conditioner is at least 1:2 or at least 1:2.5. In some embodiments the width/height ratio is even bigger such as at least 1:3 or in the range 1:3-1:4. This will result in an air-conditioner unit that demands considerably less floor space than existing portable air conditioners with a comparable performance, which can be advantageous.

The components of the assembly are advantageously fitted in a housing. FIG. 16 depicts a housing frame 1600 for a portable air-conditioner in different views. The housing can be based on an inner frame. The frame can be made of injection molded plastic and functions both as a mounting connection for the components as well as a part of the self-evaporating system. The components of the portable air conditioner are sealed in a cylinder or similar. To facilitate easy access to all components a frame that is openable in order to ease assembly and maintenance can be provided. The openable halves are jointed in the back and connected together in the upper and lower front with snap fits. FIG. 16 shows how the frame opens around the components.

Air Filter

In accordance with some embodiments the air inlet holes were, instead of traditionally vent holes, equipped with a rough fabric on the outside in order for the holes to blend in more and give an overall soft expression. The fabric has rather open cells in order to not create a large pressure drop, which would mean that the fans have to work harder. Furthermore the fabric is advantageously non-attractive to dust, since it should not absorb dirt from the air flow and by that require more maintenance. Preferably the fabric should have plastic integrated in order to retract dust better.

Figure 17:
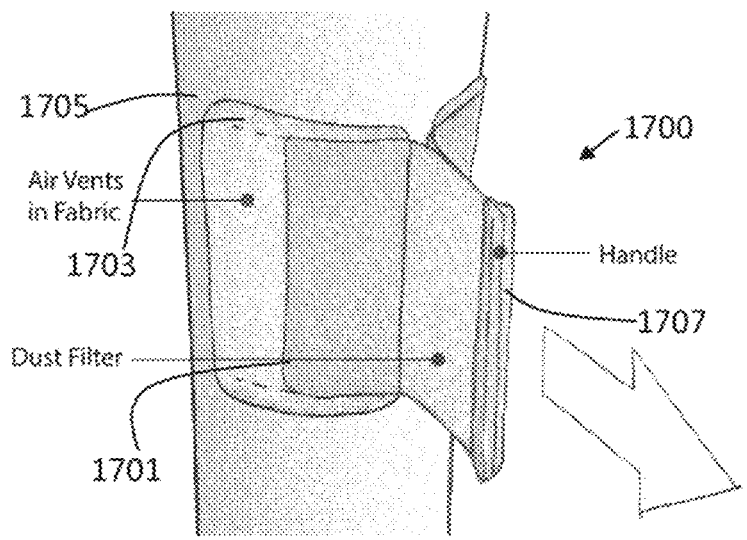
FIGS. 17 and 18 show air filters for an air-conditioner unit.

In accordance with some embodiments, on the inner side of the fabric, there are filters placed in order to clean the incoming air. FIG. 17 depicts a filter unit 1700 for an air-conditioner. Filter(s) 1701 can be mounted on a rail 1703 on the air conditioner housing 1705. The filter(s) can be removed by dragging filter handles 1707 on the unit back, which will let the filters glide along the air conditioner circumference, as can be seen in FIG. 17.

Other possibility is introducing the filters in a lateral of the unit, using the same idea of the circular rails.

Figure 18:
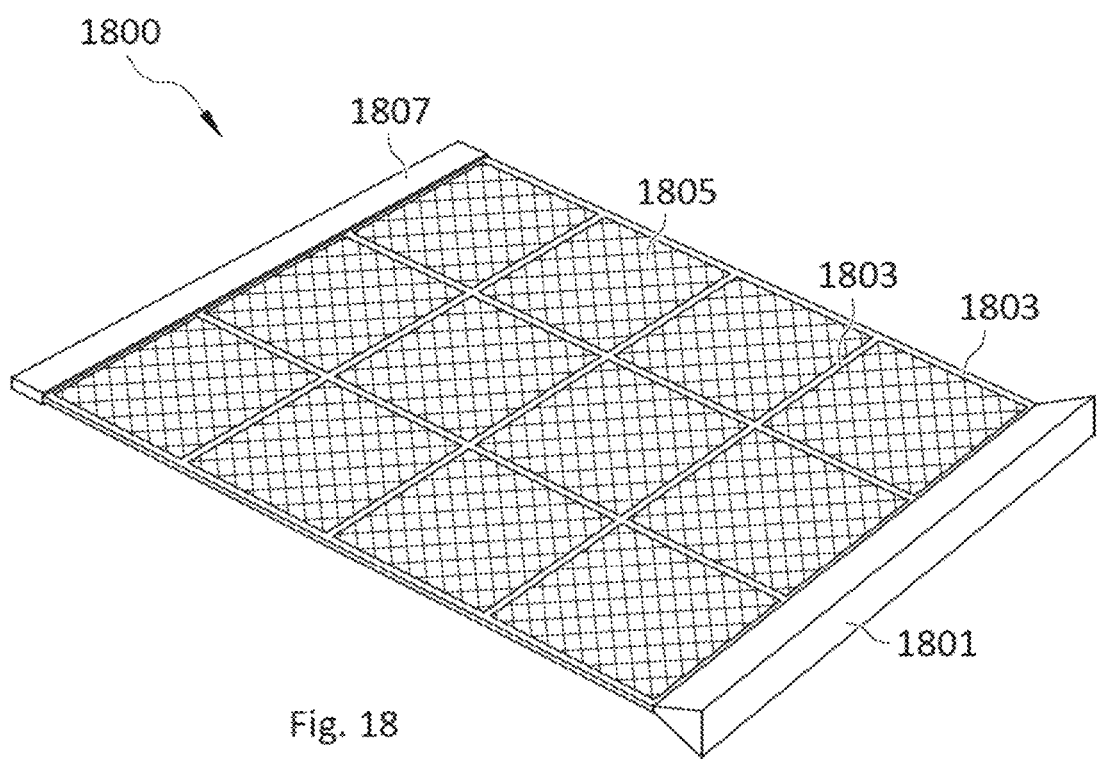

In FIG. 18 an exemplary air filter unit 1800 is shown in more detail. The filter unit in FIG. 18 is advantageously used when the housing of a portable air conditioner is generally cylindrical. The filter unit can comprise a handle 1801 to hold the filter unit in when inserting or removing the filter to/from the air conditioner. Further the filter unit can comprise a fixating frame 1803 to provide a filter 1805 with a stiffness that is designed for easy insertion of the filter unit. Also the filter unit can have a directing bar 1807 in the front to even further ease insertion of the filter unit. In accordance with some embodiments one handle is connected to two parallel filter fixating frames. Hereby two parallel filters can be exchanged in one motion.

A portable air conditioner can in accordance with some exemplary embodiments look like in FIG. 19 that depicts both inner and outer features of a portable air conditioner. Using the portable air-conditioner as described herein can provide a smaller portable air conditioner with improved performance. It is to be understood that even if some features are described in conjunction with a particular embodiment, features from different embodiments can be combined to provide additional embodiments having features from different described embodiments.

The invention claimed is:

1. A portable air conditioner (400) comprising a compressor (401), a condenser (405), and an evaporator (403) located inside a housing, the portable air conditioner (400) further comprising a cool air inlet and outlet and a warm air inlet and outlet, the portable air-conditioner (400) further comprising an evaporator fan (411) and a condenser fan (409), characterized in that the housing of the portable air-conditioner (400) has an elongated shape with end sections forming a top section and a bottom section, respectively, wherein the evaporator fan (411) is an axial fan and the condenser fan (409) is a radial fan, wherein the portable air conditioner (400) is adapted to generate a cool air stream in an upwards direction, wherein the portable air conditioner (400) is provided with a shield for deflecting the upwards cool air stream in a radial direction, wherein the shield is generally cone shaped with a curved wall, and wherein the shield has an opening in the middle for letting air pass in an upwards direction.

* * * * *